United States Patent [19]

Raley, Jr.

[11] 4,086,192

[45] Apr. 25, 1978

[54] OLEFIN POLYMER COMPOSITION HAVING REDUCED FLAME PROPAGATION CHARACTERISTICS

[75] Inventor: Charles F. Raley, Jr., Midland, Mich.

[73] Assignee: The Dow Chemical Company, Midland, Mich.

[21] Appl. No.: 608,593

[22] Filed: Aug. 28, 1975

Related U.S. Application Data

[63] Continuation-in-part of Ser. No. 168,756, Aug. 3, 1971, abandoned, which is a continuation-in-part of Ser. No. 53,332, Jul. 8, 1970, abandoned.

[51] Int. Cl.² .............................................. C08J 9/10
[52] U.S. Cl. ......................... 260/2.5 FP; 260/2.5 HA; 260/28.5 A; 260/28.5 D; 260/45.7 P; 260/DIG. 24
[58] Field of Search ................... 260/2.5 FP, 45.7 SS, 260/45.75 J, 45.7 P, 2.5 AJ

[56] References Cited

U.S. PATENT DOCUMENTS

| | | | |
|---|---|---|---|
| 3,412,052 | 11/1968 | Taylor et al. | 260/2.5 FP |
| 3,650,300 | 3/1972 | Listner | 260/45.7 P |
| 3,655,589 | 4/1972 | Wingler et al. | 260/2.5 FP |

FOREIGN PATENT DOCUMENTS

| | | | |
|---|---|---|---|
| 1,028,553 | 5/1966 | United Kingdom | 260/2.5 BB |

*Primary Examiner*—Morton Foelak
*Attorney, Agent, or Firm*—Michael S. Jenkins

[57] ABSTRACT

Flame propagation characteristics of olefin polymers containing halogenated organic moiety are markedly reduced by incorporating therein elemental phosphorus. The resulting compositions are particularly useful in fabrication of foamed olefin polymers.

28 Claims, No Drawings

OLEFIN POLYMER COMPOSITION HAVING REDUCED FLAME PROPAGATION CHARACTERISTICS

CROSS REFERENCE TO RELATED APPLICATIONS

This is a continuation-in-part of Ser. No. 168,756 filed Aug. 3, 1971 now abandoned which is a continuation-in-part of Ser. No. 53,332 filed July 8, 1970 now abandoned.

BACKGROUND OF THE INVENTION

This invention relates to polymer compositions which contain a normally flammable and/or poorly flame retardant olefin polymer, elemental phosphorus and halogenated organic moiety.

By reason of their favorable physical properties and relatively low cost, olefin polymers have been used for most widely diverse applications including applications as solid molding materials and as foamed compositions.

In recent times, it has become increasingly important to impart flame resistant properties to olefin polymers. This is particularly true where solid olefin polymers are used as insulating material in the electrical industry and where foamed olefin polymers are used as insulation and to prevent risk of fire in the daily use of other items.

It has been proposed heretofore to impart flame-retardancy to an olefin polymer by incorporating various additives into the polymer. Flame-retardance has been obtained, for instance, by combining with the polymer a solid chlorinated hydrocarbin, e.g., chlorinated paraffin, with a flame-retardant inorganic oxide, preferably antimony oxide, in critical proportions to each other and to the polymer. Such compositions are described in U.S. Pat. Nos. 2,480,298, 2,590,211 and 2,669,521.

In view of the relatively high cost and possible ecological hazards of antimony oxide and the substantial amounts by weight which must be employed to impart reduced burning characteristics to olefin polymers, it would be highly desirable to provide a more economical and non-toxic means for reducing the propensity of olefin polymers to propagate combustion after a low scale ignition source has been removed.

SUMMARY OF THE INVENTION

The present invention is an improved olefin polymer composition containing a halogenated organic moiety, wherein the improvement comprises the olefin polymer composition containing an amount of elemental phosphorus having a specific gravity greater than 2 sufficient to reduce the propensity of the olefin polymer composition to propagate burning or combustion after the removal of a small scale ignition source, hereinafter called reduced flame propagation. By small scale ignition source is meant one which is comparable to a Bunsen burner in total heat output.

As contrasted with prior art olefin polymer compositions containing a non-flammable oxide or oxychloride or antimony, bismuth and arsenic, the composition of the present invention contains elemental phosphorus which burns readily. Therefore it is surprising that the composition of the present invention has reduced flame propagation characteristics comparable to conventional olefin polymer compositions containing antimony oxide. While this invention as claimed is limited only as to the ingredients of the composition as set forth herein and not to any particular theory, it is believed that, upon exposing the composition of the present invention to open flame, the elemental phosphorus combines with halogen supplied by the halogenated organic moiety to form a halide or oxyhalide of phosphorus which suppresses further combustion after the small scale ignition source is removed.

In addition to reduce flame propagation, this composition retains essentially all of the desirable physical characteristics of the virgin olefin polymer and is accordingly a further improvement over prior art compositions. In fact, it is found that the compositions of the present invention are more resistant to photodegradation than the olefin polymers from which they are made. Also the residues of the compositions of the present invention are non-toxic. Therefore such compositions are utilized in applications which conventionally employ olefin polymers. Illustratively, such applications include solid olefin polymers for use in insulation of electrical cables and the like; foamed olefin polymers for use in construction, e.g., building panel splines; electrical applications; refrigeration cold line insulation; packaging; life-jacket inserts; cushioning and the like.

For the purposes of this invention, the term "olefin polymer composition" means a composition comprising an olefin polymer and a halogenated organic moiety which compositions burns for a measurable period of time, e.g., at least one second, after removal of the ignition source.

The olefin polymer compositions are generally compositions which do propagate the flame more than one second after removal of flame therefrom. It is these compositions that exhibit improved flame retardance as a result of the incorporation of elemental phosphorus.

The term "olefin polymer" is defined as a polymer of α-olefin and substituted α-olefin, inclusive of homopolymers and copolymers and mixtures thereof.

DESCRIPTION OF PREFERRED EMBODIMENTS

Of particular interest are the normally solid, high and low density homopolymers and copolymers of α-olefins and substituted α-olefins such as the following: the α-monoolefins such as ethylene, propylene, butene-1, isobutylene and others having from 4 to 12 carbon atoms; the halogenated monovinylidene carbocyclic aromatics such as ar-chlorostyrene, ar-bromostyrene, ar,ar-dibromostyrene, ar,ar-dichlorostyrene, and the like; α-diolefins such as butadiene, isoprene and others having 12 carbon atoms or less. Also included are homopolymers and copolymers of substituted α-monolefins wherein the substituents can be halo, alkyl or haloalkyl having from 1 to 12 carbon atoms; carboxylic acid having from 3 to 8 carbon atoms; alkyl or haloalkyl ester of carboxylic acid wherein alkyl or haloalkyl has from 1 to 12 carbon atoms, α-alkenyl having 2 to 12 carbon atoms; acyl having from 1 to 12 carbon atoms; carboxylate having from 1 to 12 carbon atoms; alkoxyl having from 1 to 12 carbon atoms; aryloxy having 6 to 12 carbon atoms; and others which are generally chemically inert to elemental phosphorus at temperatures up to those used to fabricate the resulting polymer composition. It is further understood that combinations of such substitutents are included. Exemplary substituted α-olefins are vinyl chloride, vinyl bromide, vinylidene chloride, acrylic acid, methacrylic acid, ethyl acrylate, n-butyl acrylate, i-butyl acrylate, diethyl maleate, ethyl hydrogen maleate, methyl ethacrylate, dibutyl itaconate, vinyl acetate, vinyl propionate, vinyl benzoate, vinyl ethyl ether, methyl vinyl ketone, acrylamide, acrylonitrile and the like.

It is understood that "olefin polymer" includes α-monoolefin/α-monoolefin copolymers such as elastomeric and non-elastomeric ethylene/propylene copolymers and ethylene/butene-1 copolymers; α-diolefin copolymers such as butadiene/styrene copolymers; and copolymers of one or more of the following: α-monoolefins, halogenated monovinylidene carbocyclic aromatics, α-diolefins as defined hereinbefore with one or more substituted α-olefins as also defined hereinbefore. In such latter copolymers, the substituted α-olefin preferably comprises up to about 50 weight percent of the copolymer with the remainder being α-monoolefin, halogenated monovinylidene carbocyclic aromatic, α-diolefin or a combination of two or more thereof. It is also understood that special purpose comonomers such as crosslinking monomers, e.g., divinyl benzene, can be used in concentrations up to 5 weight percent or more depending on the comonomer and the characteristic desired.

It is further understood that "olefin polymer" includes normally flammable diene polymer-modified compositions such as the so-called "high impact polystyrenes and high impact substituted styrene polymers" which contain minor amounts, e.g., from about 2 to about 25 weight percent, of a diene rubber such as polybutadiene, elastomeric styrene/butadiene copolymer inclusive of the random, block and graft varieties, polyisoprene and the like or an ethylene/propylene rubber.

Of special interest are the normally flammable homopolymers and copolymers of aliphatic hydrocarbon α-monoolefin monomers containing from 2 to 12 carbon atoms with the copolymers containing less than 50 mole percent of other copolymerizable monomer, preferably less than 30 mole percent. Also included among the polymers of special interst are the nuclearly chlorinated and brominated monovinylidene aromatic carbocyclic polymers and copolymers containing at least 50 mole percent of the chlorinated and/or brominated aromatic monomer, including such materials containing typical impact strength modifiers such as the diene rubbers; other compositions of special interest are the high impact styrene polymers and copolymers contaning from 2 to about 25 weight percent of impact modifier such as the diene rubbers and ethylene/propylene rubbers.

Of primary interest are polyethylene, polypropylene, ethylene/ethyl acrylate copolymers, ethylene/acrylic acid copolymers, ethylene/vinyl acetate copolymers and the high impact styrene polymers.

The term "elemental phosphorus" as used herein, refers to the colored allotropic forms of elemental phosphorus having specific gravities greater than 2.0. Specifically the term includes red phosphorus having specific gravity of about 2.34, black phosphorus having specific gravity of about 2.70, and violet phosphorus having specific gravity of about 2.36 all being described in The Handbook of Chemistry and Physics, 48th ed., The Chemical Rubber Co., B203 (1967-68). Also included are mixtures of the red, black and/or violet forms. Red phosphorus which is usually a brownish red powder which is insoluble in water and carbon disulfide and is both non-poisonous and non-luminous is preferred. Preferred are powders having particle size less than about 200 microns, especially those less than about 150 microns.

By "halogenated organic moiety" is meant halogenated organic groups which form component part or parts of organic compounds, component part or parts of the olefin polymer macromolecules as defined hereinbefore or both. Advantageously, the halogenated organic moiety contains a plurality of bromine and/or chlorine atoms with the combined concentration thereof being in the range between about 1 to about 97 weight precent based on the halogenated organic moiety, more advantageously from about 25 to about 95 weight percent and most advantageously from about 50 to about 95 weight percent.

Examples of halogenated organic moeity as component part or parts of the olefin polymer macromolecules include olefins suitably copolymerized with vinyl chloride, vinylidene chloride, 2,3,3-tribromopropene, 2,3,3-trichloropropene, vinyl bromide, ar-bromostyrene, ar-chlorostyrene, ar-dibromostyrene and the like. Also included with such examples is chlorinated polyethylene and chlorinated polypropylene having chlorine concentration of from about 1 to about 80 weight percent.

Compounds having halogenated organic moiety which are operably employed in the practice of this invention are chemically inert to the elemental phosphorus described hereinbefore at temperatures from ambient up to the temperatures employed in incorporating the phosphorus and the halogenated organic compound into the olefin polymer and in fabricating the polymer to a desired shape. It is further required that the halogenated organic compounds are substantially inert to the olefin polymer at such temperatures. Preferably the halogenated organic compounds have chlorine and/or bromine in concentrations ranging from about 25 to about 97 weight percent based on halogenated organic compound, especially from 50 to 95 weight percent.

The most useful embodiments of the present invention are improvements on conventional compositions of olefin polymers containing halogenated organic compounds and commonly having incorporated therein a fire retarding amount of antimony oxide. The improvement of these embodiments comprises substitution of elemental phosphorus, described hereinbefore, for at least a portion of the antimony oxide. Therefore, it is to be understood that halogenated organic compounds used heretofore in combination with antimony oxide for the purposes of reducing the propensity of olefin polymers to promote combustion after removal of the ignition source are suitable halogenated organic compounds for the purposes of this invention. It is to be further understood that halogenated organic compounds not employed heretofore in combination with antimony oxide may also be suitably employed provided, in the practice of this invention, they are inert to the elemental phosphorus at polymer fabrication temperatures and below, i.e., the temperature at which the polymer begins to degrade and below.

Halogenated organic compounds which are suitably present in olefin polymer composition and which combine with the elemental phosphorus to reduce flame propagation in olefin polymers are preferably the active halogenated compounds such as the active chlorinated, the active brominated, and the active chlorinated-brominated organic compounds; the passive brominated organic compounds; the passive chlorinated-brominated compounds, and mixtures thereof.

By "active chlorinated organic compound" is meant an organic compound which contains from about 25 to about 90 weight percent chlorine and which has either α-hydrogen and/or α-chlorine available for dehydrochlorination or dechlorination. Examples of active chlorinated compounds include chlorinated paraffins containing from about 50 to about 80 weight percent chlorine, particularly those having chlorine content of about 60 to 75 weight percent and from 18 to 40 carbon atoms in the molecular chain; chlorinated polyethylene particularly those having chlorine content above 30 weight percent preferably from about 50 to about 80 weight percent, chlorinated castor oil or chlorinated tall oil; chlorinated cyclic hydrocarbons having from 5 to 12 carbon atoms such as hexachlorocyclohexane; hexachlorocyclododecane, etc; chlorinated acyclic hydrocarbons such as hexachloroethane, pentachloroethane, and hexachloropropane; and the like.

Active brominated compounds contain from about 30 to about 95 weight percent of bromine and have either α-hydrogen or α-halogen available for dehydrobromination or dehalogenation. Examples include hexabromocyclohexane, lower brominated cyclohexanes, octabromododecane, 1,2,3,4-tetrabromobutane, 1,2-dibromoethylbenzene, hexabromoethane, acetylene tetrabromide, hexabromocyclododecane, octabromohexadecane and the like.

By "passive brominated organic compound" is meant a compound in which the bromine atoms are relatively thermally stable, i.e., the compounds do not dehydrohalogenate or dehalogenate at temperatures below about 150° C. Passive brominated organic compounds are further defined as those having the bromine(s) substituted on aromatic carbon, vinyl carbon or otherwise situated such that no α-hydrogen or α-halogen is available for normal dehydrohalogenation or dehalogenation. Passive brominated organic compounds include carbocyclic aromatic bromine compounds represented by the chemical formula

wherein Ar is a monocarbocyclic aromatic group such as phenyl, a condensed polycarbocyclic aromatic group such as naphthyl and anthracenyl, and a polycarbocyclic aromatic group such as biphenyl and terphenyl; A is hydrogen, hydrocyl, alkyl or haloalkyl (including polyhaloalkyl) having from 1 to 12 carbon atoms, aryl or haloaryl (including polyhaloaryl) having from 6 to 12 carbon atoms; halogen other than bromine, alkoxy or haloalkoxy (including polyhaloalkoxy) having from 1 to 12 carbon atoms, with the understanding that A can be one or more of the above in a particular aromatic bromine compound; $m$ is 0 to 13; and $n$ is 1 to 14. Passive brominated organic compounds also include acyclic aliphatic bromine compounds represented by the chemical formula

wherein X and Y are individually hydrogen, halogen, aryl, hydroxyaryl, vinyl and similar organic radicals which do not provide halogen normally removable or hydrogen at the α-position to Br and Z is an alkyl, hydroxyalkyl or haloalkyl (including polyhaloalkyl) having 1 to 12 carbon atoms, which alkyl, hydroxyalkyl or haloalkyl do not provide a normally removable hydrogen, halogen or hydroxyl in the α-position to Br; aryl, haloaryl (including polyhaloaryl) or hydroxyaryl having 6 to 12 carbon atoms; vinyl or halovinyl including polyhalovinyl; alkoxy, aryloxy, and haloaryloxy. Also included are esters of carboxylic acids and inorganic acids such as phosphoric acid wherein the ester moiety contains a thermally stable bromine. Also suitable are alcohols having acyclic vinylic bromine radicals represented by the formula

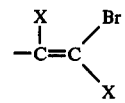

wherein X is halogen, hydrogen, alkyl or haloalkyl, including polyhaloalkyl, having from 1 to 12 carbon atoms. Illustrative passive brominated compounds include the following: hexabromobenzene, pentabromobenzene; tetrabromobenzene; 2,4,6-tribromophenylacrylate; tribromobiphenyl; octabromobiphenyl; decabromobiphenyl; pentabromodiphenyl ether; hexabromodiphenyl ether; octabromodiphenyl ether; decabromodiphenyl ether; 2-(2,4,6-tribromophenoxy)ethyl acrylate; 1,2-bis(p-2,3,3-tribromoallyloxyphenyl)-1,2-dibromoethane; 1-(2,4,5-tribromophenyl)-1-(2,4,6-tribromophenoxy)ethane; tetrabromobisphenol-A; 2,3,3-tribromoallyl ethers of tetrabromobisphenol-A; bis(2,4,6-tribromophenyl)ether of 1,4-butanedioil; bis(2,4,6-tribromophenyl)ether of 1,2-ethanediol; 2,4,6-tribromophenyl ether of 2,3,4-tribromo-2-butenol; 1,1-bis(tribromophenoxymethyl)ethane; bis(tribromophenyl) ether of 1,4-butynediol; bis(pentabromophenyl) ether of 1,4-butynediol; bis(tribromophenyl)ether of 1,4-butendiol; bis(pentabromophenyl)ether of 1,4-butendiol; bis(2,3-dibromo-2-butenediol)ester of tris(-bromomethyl) acetic acid; 1-(2,4,5-tribromophenoxy)-1-(pentabromophenyl) ethane; 1-(2,4,5-tribromophenoxy)-1-(trichlorophenyl) ethane; 1-(2,4,5-tribromophenoxy)-1-(pentachlorophenyl) ethane; (2,3-dibromo-2-butenyl)bis(tribromophenylcarbonate); (2,3-dibromo-2-butenyl)bis(tribromophenoxyacetate); 2,3,3-tribromoallyl 1,2,4-tribromophenyl ether; tris(pentabromophenyl)phosphate; tris(tribromoneopentyl)phosphate; pentaerythrityltribromide; tetrabromophthalic anydride; pentaerthyrityltribromide; tribromoepentyl alcohol esters and 2,3,3-tribromoallyl alcohol esters of saturated and unsaturated carboxylic acids such as formic, acetic, acrylic methacrylic, propionic and similar such acids having less than 18 carbon atoms; 2,3,3-tribromoallyl 2,4,6-tribromophenyl ether; 2,3,3-tribromoallyl 4-bromophenyl ether, 2,3,3-tribromoallyl alcohol esters and tribromoneopentyl alcohol esters of inorganic acids such as phosphoric acid; bromonaphthalene and polybromonaphthalene, 2,4,6-tribromophenyl acrylate, bis(2,3,3-tribromoallyl) maleate, 2,2-bis[3,5-dibromo-4-(2,3,3-tribromoalloxy)phenyl]propane; 2,3,3-tribromoallyl triphenylmethyl ether; 2,2-bis[3,5-dichloro-4-(2,3,3-tribromoalloxy)phenyl]propane; 2,3,3-tribromoally 1,6-dibromo-2-naphthyl ether; 2,3-dibromo-2-butenyl 2,4,6-tribromophenyl ether; 2,3-dibromo-2-butenyl 2,6-dibromo-4-tert,-butyl phenyl ether; and the 2-ethylhexyl-, n-octyl-, nonyl-, butyl-, dodecyl-, and 2,3-dioxypropyl ethers of tribromophenol.

Exemplary active or passive brominated-chorinated organic compounds include bromochlorocycloalkanes such as pentabromomonochlorocyclohexane, tribromotrichlorocyclohexane, tetrabromodichlorocyclohexane, tetrachlorodibromoethane, tribromomonochlorodiphenyl ether, tribromodichlorodiphenyl ether, and the 2-ethylhexyl-, n-octyl-, nonyl-, butyl-, dodecyl-, and 2,3-dioxypropyl ethers of tribromomonochlorophenol and tribromodichlorophenol.

Halogenated organic compounds which are also operable for the purposes of this invention include pentachloroethane, hexachloroethane, 2,2-bis[3,5-dibromo-4-(2,3,3-tribromoallyloxy)phenyl]propane, hexachlorocyclopentadiene, chlorinated diphenyl, dimerized hexachlorocyclopentadiene, hexachloroendomethylene tetrahydrophthalic acid and its derivatives, tetrachlorobutyrolactone, tetrachlorobutanediol diacetate, polyvinyl choride, post-chlorinated polyvinyl chloride, chlorinated polybutadiene or polyisoprene, and the like. Moreover, operable halogenated organic compounds include trihaloalkyl phosphites and phosphates, e.g., tris-(2-cloroethyl)phosphite, tris-(2,3-dibromopropyl)phosphite, tris-(2,3-bromopropyl) phosphate, tris(2,3-dichloropropyl)phosphite, and the like. Although not usually employed for economical reasons, similar iodinated organic compounds may be suitably employed. Mixtures of two or more of the aforementioned halogenated organic compounds can be employed. A particularly effective mixture contains a halogen-containing aliphatic or cycloaliphatic compound having a hydrogen or halogen atom attached to a carbon atom alpha to a halogen-subsitituted carbon atom, e.g., chlorinated paraffin, hexabromocyclohexane and the like, and a bromine-containing aromatic compound wherein bromine is substituted on the aromatic ring or bromine-containing acyclic compound having either a vinylic bromine or not having a hydrogen or halogen atom attached to a carbon atom alpha to a bromine subsitituted carbon atom, e.g., hexabromobenzene, pentabromobenzene and tribromoneopentyl and 2,3,3-tribromoallyl esters of carboxylic acids such as formic, acetic, maleic, propionic or inorganic acids such as phosphoric.

The amount of elemental phosphorus employed in the practice of this invention depends primarily on the reduction of flame propagation required and secondarily on the particular olefin polymer and on the type and amount of halogenated organic moiety to be used. For the purposes of this invention, an amount of phosphorus effective to provide reduced flame progagation is that amount which when incorporated into the olefin polymer composition measurably reduces the tendency of that composition to burn up removal of a low scale ignition source. Generally it is desirable to reduce the burning characteristics of the olefin polymer such that it ceases to burn within 30 seconds after removal of the low scale ignition source used to heat and ignite a standard test bar (solid or foamed) of the composition a determined by a multiple ignition test described hereinafter, although any reduction of the burning characteristics of the olefin polymer is suitable for the purposes of this invention. Since the reduction of burning characteristics is dependent in part on the particular olefin polymer and halogenated organic moiety to be employed, it is not possible to specify minimum amounts of phosphorus and of halogenated organic moiety which are useful in every suitable olefin polymer. In view of illustrative teachings and examples of the invention hereinafter, amounts of phosphorus and halogenated organic moiety required to provide reduced flame propagation in a particular olefin polymer can be readily determined by those skilled in the art of fire retardant polymers. Illustratively, however, best results are obtained with about 0.5 to about 20 parts by weight of elemental phosphorus per hundred weight parts of olefin polymer, preferably from about 1 to about 10 parts, and an amount of halogentated organic moiety such that the atomic ratio of phosphorus to halogen is from about 4:1 to about 1:6, preferably from about 2:1 to about 1:3. Especially preferred self-extinguishing compositions contain at least about 5 weight parts of additive which is the sum of elemental phosphorus and halogenated organic moiety per 100 weight parts of olefin polymer.

In making the improved olefin polymer composition in accordance with this invention, the elemental phosphorus and the halogenated organic compound or compounds, when the latter are used, are incorporated separately or as a mixture thereof into the olefin polymer by dry-blending the additive ingredients with granular or powdered olefin polymer and feeding the resulting mixture of polymer and additives through a plastic extruder, or by mixing the additives and polymer on a hot roll mill or in a Banbury mixer or by some other conventional technique for incorporating solid additives into a plastic polymer. Of course, when halogen is already a part of the polymer structure to provide the required halogenated organic moiety, additional halogen-containing additive may not be required. Minor amounts, preferably up to about 25 weight parts per 100 parts, of olefin polymer, of such additives as dyes, stabilizers, fillers, nucleating agents, carbon black, reinforcing materials, e.g., metallic particles or fibers and the like materials which are chemically inert to the elemental phosphorus can also be incorporated into the olefin polymer, but are not required in the invention. In some cases up to 100 weight parts of fillers per 100 weight parts of polymer may be employed.

In a particularly desirable embodiment, a composition of from about 1 to about 20 weight parts of carbon black, from about 2 to about 20 weight parts of phosphorus, from about 2 to about 20 weight parts of halogen in form of halogenated organic moiety and 100 weight parts of olefin polymer is employed. Such composition is particularly useful as cable or electrical wire jacketing.

In instances wherein foamed olefin polymer is desired, a homogeneous mobile of flowable gel composition of heat-plastified or molten olefin polymer, a suitable amount of elemental phosphorus and halogenated organic compound(s), when needed to supply halogenated organic moiety, and a conventional volatile organic foaming agent which is inert to the phosphorus is formed under pressure. Thereafter said composition is extruded into a zone of lower pressure sufficient to cause expansion of the extruded material with resultant formation of a foamed olefin polymer composed for the most part of uniformly fine individually-closed thin-walled cells. The mobile or flowable gel is prepared by placing the olefin polymer and ingredients under the pressure of the foaming agent, suitably at temperatures above the crystalline melting point of the olefin polymer, e.g., about 90° to 250° C, such as by heating the ingredients in admixture with one another in a pressure resistant vessel or an extruder until a homogeneous or substantially uniform flowable gel is obtained. The gel is preferably extruded at a temperature near or above the melting point of the olefin polymer, but higher or lower temperatures can be used. For example, the gel can be extruded at a temperature of from about 25° C below the temperature at which crystallization of the olefin polymer causes an observable cloudiness of the gel up to a temperature 25° C above the melting point of the olefin polymer.

The pressure to be maintained on the gel prior to extrusion into a zone of lower pressure should be at least about as high as that of the vapor pressure of the volatile organic foaming agent and sufficient to prevent foaming in the extruder or discharge orifice. Pressures of from about 300 to 2,000 lbs/sq. in. or higher, gauge pressure, can be used.

The volatile organic foaming agent should be a nonsolvent or poor solvent for the olefin polymer such as 1,2-dichlorotetrafluoroethane, dichlorodifluoromethane, isobutane, methyl choride, 1,1,1-trifluoroethane, ethylidene fluoride, perfluoropropane, 2,2-difluoropropane, each alone or mixtures thereof and the like, but one that dissolves in the polymer in an amount of up to about 30 percent by weight sufficient to form a mobile or flowable gel and expand the extruded gel to produce a cellular or foamed body. The foaming agent can be employed in amounts of from about 3 to about 30 weight percent based on olefin polymer. Other techniques commonly employed in the production of foamed olefin polymer may also be utilized.

In the preparation of solid (non-foamed) articles of olefin polymer, the olefin polymer having elemental phosphorus and halogenated organic moiety incorporated therein is advantageously ground, cut or broken into granular form and then extruded, molded or otherwise fabricated by conventional techniques into the desired shape.

The following examples illustrate ways in which the principle of the invention has been applied, but are not to be construed as limiting its scope. All parts and percentages are by weight unless otherwise indicated.

EXAMPLE 1

One hundred parts of granular polyethylene having a melt index of 2 decigrams/minute as determined by ASTM D-1238-65T(E) together with 6.2 parts of elemental red phosphorus having a specific gravity of 2.20 and an average particle size of <75 microns, and 10 parts of chlorinated paraffin wax containing about 70 percent chlorine (P:Cl~1:1) are compounded thoroughly on a hot roll mill at temperatures about 140°-150° C, and then reintroduced, such that the entire mass is plastified and apparently homogeneous. The resultant mixture is cooled, ground into small particles and fed into a plastic extruder at a rate corresponding to 7 pounds of the mixture per hour. The plastic extruder has a barrel enclosing a 1¼ in. diameter screw equipped with a mixing head similar in design to that described in U.S. Pat. No. 2,453,088. A sealing plate is positioned midway of the screw and an inlet to the barrel is provided adjacent to the sealing plate for feeding volatile organic blowing agent into the barrel and into contact with the polyethylene. The sealing plate forms a constricted passageway between the rim of the plate and the bore of the barrel so that flow of the heat-plastified polyethylene through the constricted passageway by pressure of the flights of the screw forms an effective plastic seal against counter-current flow or leakage of the volatile organic compound from the extruder. The heat-plastified polyethylene formation is forwarded under pressure of the screw around the sealing plate and into the second section of the barrel of the extruder wherein it is mixed with 1,2-dichlorotetrafluoroethane as a foaming agent fed thereto at a rate of 1.6 lbs/hr. The resulting mixture is blended under pressure, e.g., 700 psig, principally by action of the mixing head on the screw of the extruder, into a uniform gel composition and is brought to a temperature of 190° C, passed through a cooling section to bring about a gel temperature of 100°-110° C, and is then forced through a discharge orifice of ¼ × ⅛ in. cross-section into the atmosphere. The extruded material is allowed to expand freely in the air. The polyethylene foam product is a cellular oval rod having a cross-section of 21 × 9 mm. and is composed of substantially uniform fine individually-closed thin-walled cells. The foam has a density of about 2.0–3.0 lbs/cu. ft. and physical properties, e.g., impact strength and tensile strength, comparable to those of polyethylene foam containing no additive.

The foamed product is tested for its burning characteristics by the following procedure (which is comparable to or more severe than the conditions prescribed by UL Standard Test No. 94 and ASTM D-635-44T): a sample (21 mm × 9 mm × 23 cm) of the foamed product is inclined at a 30° angle below horizontal while in a draft-free enclosure; a gas flame ~1 in. high is applied to the lower end of the sample for 5 sec. which causes ignition; the flame is then removed and the time for the ignited sample to extinguish itself is measured. There are up to 30 ignitions, up to 10 for each of 3 samples depending on burning time. The times required for the foam samples to extinguish after removal of the flame (average extinction times) are in the range of 1–4 seconds. It is well recognized by those skilled in this art and should be clearly understood by others, however, that all known organic polymers will propagate combustion when subjected to a sufficiently intense heat source even though they contain additives for reducing their burning characteristics.

For purposes of comparison, polyethylene foam is prepared and tested under similar conditions except for using 8 parts per 100 parts of polymer of antimony trioxide and 8 parts of chlorinated paraffin wax containing about 70 percent by weight of chlorine. The foam obtained by this procedure extinguishes after 11.2 seconds.

EXAMPLE 2

Several samples of solid (non-foamed) olefin polymers are prepared by compounding various proportions (specified in Table I hereinafter) of a variety of olefin polymers, elemental red phosphorus as specified in Example 1, and a variety of halogenated organic compounds on a laboratory mill of the Banbury type using conditions specified in Example 1. The resulting samples are compression molded into test bars at temperatures of 140°-180° C.

The resulting test bars (⅝ × ⅛ × 8 inches) are tested for burning characteristics according to the test method employed in Example 1 except that 20 ignitions of each of two samples are used. The results are shown in Table I.

TABLE I

| Sample No. | Polymer (1) | Halogenated Organic Compound | Concentration of Halogenated Organic Compound, pts per 100 pts of polymer | Phosphorus Concentration, pts per 100 pts of polymer | Atomic Ratio of P to Halogen | Average Extinction Time, sec |
| --- | --- | --- | --- | --- | --- | --- |
| 2 | PE | Hexabromobenzene | 10 | 3.36 | 1:1 | 1.5 |
| 3 | PE | Chlorinated Paraffin Wax (70% Cl) | 10 | 6.18 | 1:1 | 1.8 |
| 4 | Et/VA | Hexabromobenzene | 10 | 1.68 | 1:2 | 3.0 |
| 5 | Et/VA | Chlorinated Paraffin Wax (70% Cl) | 10 | 3.09 | 1:2 | 2.5 |
| 6 | Et/VA | Tetrabromobisphenol-A | 14.8 | 1.68 | 1:2 | 2.7 |
| 7 | Et/VA | Bis(2,3,3-tribromoally) ether of Tetrabromo-bisphenol-A | 13.0 | 1.68 | 1:2 | 2.2 |
| 8 | Et/VA | 1,4-Bis(2,4,6-tribromophenoxy)-2,3-dibromobutene-2 | 11.9 | 1.68 | 1:2 | 4.2 |
| 9 | Et/VA | 2,4,6-tribromophenyl 2,3,3-tribromoally-ether | 11.0 | 1.68 | 1:2 | 3.1 |
| 10 | Et/VA | Tetrabromophthalic anhydride | 12.6 | 1.68 | 1:2 | 4.2 |
| 11 | Et/VA | Tribromoneopentyl alcohol | 11.7 | 1.68 | 1:2 | 5.8 |
| 12 | Et/VA | Tris(tribromoneopentyl) phosphate | 12.3 | 1.68 | 1:2 | 2.4 |
| 13 | Et/VA | Tetrabromobenzene | 10.7 | 1.68 | 1:2 | 4.8 |
| 14 | Et/VA | 1,2-dichlorotetrabromo-benzene | 12.6 | 1.68 | 1:2 | 3.9 |
| 15 | Et/VA | 1,4-dichlorotetrabro-mobenzene | 12.6 | 1.68 | 1:2 | 3.4 |
| 16 | Et/VA | Tribromophenol | 12.0 | 1.68 | 1:2 | 4.4 |
| 17 | Et/VA | Pentabromophenol | 10.6 | 1.68 | 1:2 | 3.1 |
| 18 | Et/VA | Pentabromomonochloro-cyclohexane | 11.2 | 1.68 | 1:2 | 2.6 |
| 19 | Et/VA | Hexabromocyclohexane | 10.1 | 1.68 | 1:2 | 5.5 |
| 20 | Et/VA | Decabromodiphenyl ether | 10.4 | 1.68 | 1:2 | 3.0 |
| 21 | Et/VA | Hexabromodiphenyl ether | 11.7 | 1.68 | 1:2 | 2.2 |
| 22 | PP | Hexabromobenzene | 10 | 3.35 | 1:1 | 1.3 |
| 23 | PP | TBPE(a) | 5 | 1.68 | 1.4:1 | 0.9 |
| 24 | Et/VA | Hexachlorobenzene | 10 | 6.53 | 1:1 | 5.5 |
| 25 | IPCS | None | 0 | 5.0 | 1:3.37 | 1.3 |
| 26 | Et/EA | TBPE(a) | 9.8 | 2.69 | 1:1 | 0.4 |
| 27 | EPR | TBPE(a) | 9.8 | 2.69 | 1:1 | 1.7 |
| 28 | Et/AA(3) | TBPE(a) | 9.8 | 2.69 | 1:1 | 0.2 |
| 29 | " | Chlorinated Paraffin Wax | 10 | 6.18 | 1:1 | 1.6 |
| 30 | Et/AA(8) | TBPE(A) | 9.8 | 2.69 | 1:1 | 3.4 |
| 31 | " | Pentabromophenol | 8.5 | 2.69 | 1:1 | 2.4 |
| 32 | IPS | TBPE(a) | 2.0 | 0.67 | 1:1 | 0.9 |
| 33 | PB | TBPE(a) | 9.8 | 2.69 | 1:1 | 0.3 |

(1) Et/VA - Ethylene/vinyl acetate random copolymer having 96% polymerized ethylene and 4% polymerized vinyl acetate and a melt flow viscosity [ASTM D-1238-65T(E)] of 2 decig/min.
PE - Low density polyethylene having a melt index [ASTM D-1238-65T(E)] of 2 decig/min.
PP - Crystalline polypropylene having a melt flow viscosity [ASTM D-1238-65T(E)] of 1 decig/min.
IPCS - Impact polymer prepared by polymerizing 75% chlorostyrene with 19% styrene and 6% polybutadiene.
Et/EA - Ethylene/ethyl acrylate random copolymer having 80% polymerized ethylene and 20% polymerized ethyl acetate and a melt flow viscosity [ASTM D-1238-65T(E)] of 2.5 decig/min.
EPR - Ethylene/propylene (1:1) copolymer elastomer.
Et/AA(3) - Ethylene/acrylic acid random copolymer having 97% polymerized ethylene and 3% polymerized acrylic acid.
Et/AA(8) - Ethylene/acrylic acid random copolymer having 92% polymerized ethylene and 8% polymerized acrylic acid.
IPS - Impact polymer prepared by polymerized 95 weight parts styrene with 5 weight parts styrene/butadiene elastomer.
PB - poly(butene-1).
(a)TBPE - 1-(2,4,5-tribromophenyl)-1-(2,4,6-tribromophenoxy)ethane.

EXAMPLE 3

For the purposes of clearly showing the unexpected and advantageous properties of the compositions of this invention, several samples of solid (non-foamed) ethylene/vinyl acetate copolymer (96/4) (Melt Flow Viscosity = 2.0) containing varying amounts of elemental phosphorus as specified in Example 1 and hexabromobenzene or chlorinated paraffin wax as specified in Example 1 are prepared and tested for burning characteristics according to the procedures of Example 2. The results of these tests are recorded in Table II.

For the purposes of comparison several comparative samples ($B_x$) of the same ethylene/vinyl acetate copolymer containing varying amounts of hexabromobenzene and the same chlorinated paraffin wax are similarly prepared and tested for burning characteristics according to the procedures of Example 2. The results of these tests are also recorded in Table II.

TABLE II

| Sample No. | Halogenated Organic Compound | Concentration of Halogenated Organic Compound, pts per 100 pts of polymer | Phosphorus, Concentration, pts per 100 pts of polymer | Atomic Ratio of P to Halogen | Average Extinction Time, sec. |
| --- | --- | --- | --- | --- | --- |
| 1 | Chlorinated Paraffin Wax | 20 | 2.06 | 1:6 | 2.5 |
| 2 | Chlorinated Paraffin Wax | 20 | 3.09 | 1:4 | 1.3 |
| $B_1$* | Chlorinated Paraffin Wax | 20 | 0 | — | Burned |
| 3 | Chlorinated Paraffin Wax | 15 | 1.55 | 1:6 | 5.2 |
| 4 | Chlorinated Paraffin Wax | 15 | 2.32 | 1:4 | 3.3 |
| $B_2$* | Chlorinated Paraffin Wax | 15 | 0 | — | Burned |
| 5 | Chlorinated Paraffin Wax | 10 | 2.06 | 1:3 | 6 |

TABLE II -continued

| Sample No. | Halogenated Organic Compound | Concentration of Halogenated Organic Compound, pts per 100 pts of polymer | Phosphorus, Concentration, pts per 100 pts of polymer | Atomic Ratio of P to Halogen | Average Extinction Time, sec. |
|---|---|---|---|---|---|
| 6 | Chlorinated Paraffin Wax | 10 | 3.09 | 1:2 | 2.5 |
| 7 | Chlorinated Paraffin Wax | 10 | 6.18 | 1:1 | 1.5 |
| $B_3$* | Chlorinated Paraffin Wax | 10 | 0 | — | Burned |
| 8 | Chlorinated Paraffin Wax | 8 | 4.94 | 1:1 | 3.2 |
| 9 | Chlorinated Paraffin Wax | 8 | 7.44 | 3:2 | 3.1 |
| $B_4$* | Chlorinated Paraffin Wax | 8 | 0 | — | Burned |
| 10 | Chlorinated Paraffin Wax | 6 | 5.58 | 3:2 | 6.4 |
| 11 | Chlorinated Paraffin Wax | 6 | 7.44 | 2:1 | 3.5 |
| 12 | Chlorinated Paraffin Wax | 4 | 4.96 | 2:1 | 8.7 |
| 13 | Hexabromobenzene | 10 | 0.84 | 1:4 | 6 |
| 14 | Hexabromobenzene | 10 | 1.12 | 1:3 | 4.2 |
| 15 | Hexabromobenzene | 10 | 1.68 | 1:2 | 3.0 |
| 16 | Hexabromobenzene | 10 | 3.36 | 1:1 | 1.9 |
| $B_5$* | Hexabromobenzene | 10 | 0 | — | Burned |
| 17 | Hexabromobenzene | 8 | 0.90 | 1:3 | 9 |
| 18 | Hexabromobenzene | 8 | 1.34 | 1:2 | 5 |
| 19 | Hexabromobenzene | 8 | 2.69 | 1:1 | 2.5 |
| 20 | Hexabromobenzene | 8 | 4.04 | 3:2 | 1.9 |
| 21 | Hexabromobenzene | 6 | 2.03 | 1:1 | 4.9 |
| 22 | Hexabromobenzene | 6 | 3.03 | 3:2 | 2.9 |
| 23 | Hexabromobenzene | 4 | 2.71 | 2:1 | 7.1 |

*Not an example of the invention.

EXAMPLE 4

In accordance with the procedure of Example 2, test bars of polyvinyl chloride containing 60 parts of dioctyl phthalate and 5 parts of elemental red phosphorus per 100 parts of polymer are prepared and tested for burning characteristics. On an average the test bars extinguish about 2.9 seconds after the flame is removed. Control test bars similar to the preceding ones except containing no phosphorus extinquish about 6.5 seconds after the flame is removed. In these compositions of polyvinyl chloride, the tendency to flammability is contributed by the plasticizer, dioctyl phthalate, since polyvinyl chloride containing no dioctyl phthalate extinguishes immediately upon removal of the flame.

EXAMPLE 5

In accordance with the procedure of Example 2, test bars of chlorinated polyethylene (37% Cl) containing 2 parts of diglycidyl ether of Bisphenol-A and 5 parts of elemental red phosphorus per 100 parts of polymer are prepared and tested for burning characteristics. The test bars exhibit an average self-extinction time of less than 1 second. Test bars similar to the preceding ones except containing no phosphorus burn.

EXAMPLE 6

In accordance with the procedure of Example 2, test bars of ethylene/vinyl acetate copolymer described in Example 2 containing 2.85 parts of elemental red phosphorus, 8.33 parts of chlorinated paraffin wax described in Example 2 and 1.67 parts of hexabromobenzene per 100 parts of polymer are prepared and tested for burning characteristics. The test bars exhibit an average extinction time of 2.1 seconds.

EXAMPLE 7

In accordance with the procedure of Example 2, test bars of composition (1) 100 parts of poly(chlorostyrene) and 3 parts of elemental red phosphorus and composition (2) 100 parts of poly(chlorostyrene) and 5 parts of elemental red phosphorus are prepared and tested for burning characteristics. The test bars of compositions (1) and (2) have average extinction times of 1.2 and 0.8 seconds, respectively. Test bars of a control composition of poly(chlorostyrene) containing no phosphorus have no average extinction time of 8 seconds.

EXAMPLE 8

In accordance with the procedure of Example 2, several samples (Sample Nos. 1-6) of solid (non-foamed) olefin polymers are prepared by compounding various proportions (specified in Table III) of olefin polyer, elemental red phosphorus, carbon black of various types, and chlorinated paraffin wax (70% chlorine). The resulting samples are compression molded into test bars at temperatures of 140°-180° C and are tested for burning characteristics in the same manner as employed in Example 2. The results are shown in Table III.

For purposes of comparison and to show particular advantage of the compositions of the present invention over prior art compositions containing antimony oxide, test bars of several compositions (Sample Nos. D1-D4) are prepared as described in the foregoing paragraph except that antimony oxide is substituted for the elemental red phosphorus. The test bars are tested for buring characteristics and the results are also recorded in Table III.

TABLE III

| Sample No. | Polymer(1) | Carbon Black(2) | Concentration of Additives, parts per hundred parts of polymer | | | | Atomic Ratio | Average Extinction Time, sec. |
|---|---|---|---|---|---|---|---|---|
| | | | Carbon Black | Chlorinated Wax | Phosphorus | Antimony Oxide | | |
| 1 | 92.9% PE + 7.1% E/VA | Channel Black | 2.5 | 10.0 | 6.18 | — | 1P:1Cl | 1.4 |
| 2 | 92.9% PE + 7.1% E/VA | Channel Black | 2.5 | 8.0 | 4.94 | — | 1P:1Cl | 2.0 |
| 3 | 92.9% PE + 7.1% E/VA | Channel Black | 2.5 | 6.0 | 3.71 | — | 1P:1Cl | 2.8 |
| $D_1$* | 92.9% PE + 7.1% E/VA | Channel Black | 2.5 | 8.2 | — | 8.0 | 1Sb:3Cl | 14 |
| 4 | 92.9% PE + | Furnace | | | | | | |

TABLE III-continued

| Sample No. | Polymer(1) | Carbon Black(2) | Carbon Black | Chlorinated Wax | Phosphorus | Antimony Oxide | Atomic Ratio | Average Extinction Time, sec. |
|---|---|---|---|---|---|---|---|---|
| | 7.1% E/VA | Black(a) | 2.5 | 8.0 | 4.94 | — | 1P:1Cl | 1.4 |
| D$_2$* | 92.9% PE + 7.1% E/VA | Furnace Black(a) | 2.5 | 8.2 | — | 8.0 | 1Sb:3Cl | 7.4 |
| 5 | PE | Furnace Black(b) | 3.3 | 8.0 | 4.94 | — | 1P:1Cl | 1.1 |
| D$_3$* | PE | Furnace Black(b) | 3.3 | 6.59 | — | 6.35 | 1Sb:3Cl | 4.7 |
| D$_4$* | PE | Furnace Black(b) | 3.3 | 8.2 | — | 8.0 | 1Sb:3Cl | 3.7 |
| 6 | 96.5% PE + 3.5% E/VA | Channel Black | 1.25 | 8.0 | 4.94 | — | 1P:1Cl | 1.3 |

*Not an example of the invention.
(1)PE - Blend of 96 parts of polyethylene having a density of 0.92 g/cc and melt index of 0.25 dg/min and 4 parts of low molecular weight ethylene/propylene copolymer.
E/VA - Ethylene/vinyl acetate (72/28) copolymer.
(2)Channel black having average particle diameter of 180 A and average surface area of 300 square meters/gram.
Furnace black(a) having average particle diameter of 230 A and average surface area of 135 square meters/gram.
Furnace black(b) having average particle diameter of 700 A and average surface area of 28 square meters/gram.

EXAMPLE 9

In accordance with the procedure of Example 2, several samples (Sample Nos. 1-4) of solid (non-foamed) olefin polymers are prepared by compounding various proportions (specified in Table IV) of olefin polymer, elemental red phosphorus, channel black having average particle diameter of 180 A and average surface area of 300 m$^2$/g, and 1-(2,4,5-tribromophenyl)-1-(2,4,6-tribromophenoxy)-ethane (TBPE). The resulting samples are compression molded into test bars at temperatures of 140°-180° C and are tested for burning characteristics in the same manner as employed in Example 2. The results are shown in Table IV.

For purposes of comparison and to show particular advantage of the compositions of the present invention over prior art compositions containing antimony oxide, test bars of several compositions (Sample Nos. E$_1$-E$_4$) are prepared as described in the foregoing paragraph except that antimony oxide is substituted for elemental red phosphorus. The test bars are tested for burning characteristics and the results are also recorded in Table IV.

onds. For purposes of comparison, test bars are similarly prepared of 100 parts of the aforementioned impact polystyrene and 2.95 parts of TBPE. The tabs are tested for burning characteristics and are observed to burn continuously.

EXAMPLE 11

One hundred parts of granular impact polystyrene as employed in Example 10 are mixed with 11 parts of decabromodiphenyl ether and 3.3 parts of elemental red phosphorus. The resulting mixture is compression molded into test tabs which are tested for burning characteristics using U.L. Standard Test No. 94. An average extinction time of ~5 seconds and non-burning drips are observed.

For purposes of comparison, a mixture of 100 parts of the granular impact polystyrene and 14 parts of decabromodiphenyl ether is prepared and converted into test tabs which are similarly tested for burning characteristics. An average extinction time of more than 10 seconds and burning drips are observed.

TABLE IV

| Sample No. | Polymer(1) | Carbon Black | TBPE | Phosphorus | Antimony Oxide | Atomic Ratio(2) | Average Extinction Time, sec. |
|---|---|---|---|---|---|---|---|
| 1 | E/VA | 2.5 | 5.00 | 1.38 | — | 1P:1Br | 8.0 |
| E$_1$* | E/VA | 2.5 | 4.45 | — | 1.93 | 1Sb:3Br | Burned |
| 2 | E/EA | 2.5 | 5.00 | 1.38 | — | 1P:1Br | 5.3 |
| E$_2$* | E/EA | 2.5 | 4.45 | — | 1.93 | 1Sb:3Br | Burned |
| 3 | PB | 2.5 | 5.00 | 1.38 | — | 1P:1Br | 6.4 |
| E$_3$* | PB | 2.5 | 4.45 | — | 1.93 | 1Sb:3Br | Burned |
| 4 | PP | 2.5 | 5.00 | 1.38 | — | 1P:1Br | 2.1 |
| E$_4$* | PP | 2.5 | 4.45 | — | 1.93 | 1Sb:3Br | 6.9 |

*Not an example of the invention.
(1)E/VA - Ethylene/vinyl acetate (96/4) copolymer.
E/EA - Ethylene/ethyl acrylate (80/20) copolymer.
PB - Poly(butene-1).
PP - Polypropylene.
(2)Optimum ratios of phosphorus or antimony to halogen.

EXAMPLE 10

In accordance with the procedure of Example 2, 100 parts of impact polystyrene consisting of 95 percent polystyrene and 5 percent polybutadiene rubber is blended with 0.81 parts of elemental red phosphorus and 2.95 parts of 1-(2,4,5-tribromophenyl)-1-(2,4,6-tribromophenoxy)ethane (TBPE), formed into test tabs and tested for burning characteristics. The test bars exhibit an average extinction time of less than 10 sec-

EXAMPLE 12

A concentrate is prepared by roll blending a mixture of 50 parts of decabromodiphenyl ether, 15 parts of phosphorus and 35 parts of the granular impact polystyrene used in Example 10. This concentrate is then ground into granules and dry blended with the impact polystyrene and blowing agent (azobisdicarbonamide) in ratio of 1 part concentrate to 4 parts impact polystyrene to 0.5 part azobisdicarbonamide.

The granular dry blend is molded at 400° F and 1800 psi (by injection pressure) for 5 minutes in a cavity mold to produce a foamed article having a density of 0.8 g/cc. The foamed article is tested for burning characteristics using U.L. Standard Test No. 94 and is observed to burn for about 10 seconds with burning drips and then extinguishes.

EXAMPLE 13

To show the improved resistance of the compositions of the present invention to photodegradation, 100 parts of polymer blend of 96 parts of polyethylene having a density of 0.92 g/cc and melt index of 0.25 dg/min and 4 parts of low molecular weight ethylene/propylene copolymer are combined with 8.0 parts of chlorinated paraffin wax (70% chlorine) and 4.94 parts of elemental red phosphorus and compression molded into test tabs in the manner of Example 8. The test tabs are exposed to conditions of ultraviolet radiation and intermittent water spray for periods of 1000 hours. At intervals during this period and at the end of the period, the tabs are tested for ultimate tensile strength and percent elongation. The results are recorded in Table V.

For purposes of comparison, 100 parts of the foregoing polymer blend are combined with 8.0 parts of the chlorinated paraffin wax and are compression molded into test tabs in the manner of Example 8. Test tabs are similarly prepared of the polymer blend alone. The resultant tabs are exposed to conditions of ultraviolet radiation and intermittent water spray for periods of 1000 hours. At intervals during this period and at the end of the period, the tabs are tested for ultimate tensile strength and percent elongation. These results are also recorded in Table V.

TABLE V

| Sample No. | Additive, parts per Hundred Parts of polymer | | Ultimate Tensile(1), | | | | % Elongation at Break (2), | | | |
|---|---|---|---|---|---|---|---|---|---|---|
| | Phosphorus | Chlorinated Wax | Hours 0 | 250 | 500 | 1000 | Hours 0 | 250 | 500 | 1000 |
| 1 | 4.94 | 8.0 | 1780 | 1710 | 1690 | 1600 | 650 | 588 | 571 | 532 |
| F* | — | 8.0 | 2113 | 2487 | 1663 | 1460 | 716 | 800 | 487 | 49.6 |
| C* | — | — | 2183 | 2433 | 1913 | 1453 | 717 | 787 | 595 | 51.9 |

*Not an example of the invention.
(1)As determined by modified ASTM D-378 using a (⅛" × 0.050" × ⅜") sample and pull rate of 2"/min.
(2)As determined by modified ASTM D-378 using a (⅛" × 0.05" × ⅜") sample and pull rate of 2"/min.

What is claimed is:

1. In an olefin polymer composition containing a halogenated organic moiety, the olefin polymer being selected from the group consisting of homopolymers and copolymers of aliphatic hydrocarbon monoolefins having no more than 12 carbon atoms, and substituted α-monoolefins wherein the substituent is carboxylic acid, alkyl or haloalkyl ester of carboxylic acid wherein alkyl or haloalkyl has from 1 to 12 carbon atoms or carboxylate having from 1 to 12 carbon atoms; the improvement which comprises the olefin polymer composition and elemental phosphorous having a specific gravity greater than 2.0 in an amount effective to reduce the propensity of the olefin polymer composition to propagate combustion after removal of a small scale ignition source provided that the atomic ratio of the phosphorus to halogen is from about 4:1 to about 1:6.

2. The improvement according to claim 1 wherein the concentration of phosphorus is from about 0.5 to about 20 parts by weight per 100 parts of polymer and the olefin polymer is a homopolymer of an aliphatic hydrocarbon monoolefin or a copolymer of an aliphatic hydrocarbon monoolefin and a substituted α-monoolefin wherein the substituent is carboxylic acid, alkyl ester of carboxylic acid wherein alkyl has from 1 to 12 carbon atoms or carboxylate having from 1 to 12 carbon atoms.

3. The improvement according to claim 1 wherein at least a portion of the halogenated organic moiety contains bromine and/or chlorine atoms, the combined bromine and chlorine concentration being from about 25 to about 97 weight percent based on the halogenated organic moiety.

4. The improvement according to claim 1 wherein the concentration of phosphorus is from about 1 to about 10 parts, the atomic ratio of phosphorus to halogen is from about 2:1 to about 1:3 and the sum of amount of phosphorus and amount of halogenated moiety is at least 5 parts based on 100 weight parts of polymer.

5. The improvement according to claim 3 wherein the halogenated organic moiety is a passive brominated organic compound.

6. The improvement according to claim 5 wherein the passive brominated compound is a bromine-containing carbocyclic aromatic compound with at least a portion of the bromine being substituted on an aromatic ring.

7. The improvement according to claim 5 wherein the passive brominated compound is a bromine-containing acyclic organic compound having a bromine substituted on a vinyl carbon.

8. The improvement according to claim 5 wherein the passive brominated compound is a bromine-containing acyclic aliphatic compound wherein a bromine is bonded to a carbon atom not having halogen or hydrogen bonded to carbon atom in position alpha thereto.

9. The improvement according to claim 1 wherein the halogenated moiety is a passive brominated compound selected from the group consisting of hexabromobenzene, 1-(2,4,5-tribromophenyl)-1-(2,4,6-tribromophenoxy)ethane, decabromodiphenyl ether, pentabromophenol, octabromobiphenyl, 1,2-bis[4-(2,3,3-tribromoallyloxy)phenyl]-1,2-dibromo ethene, and tetrabromobisphenol-A.

10. The improvement according to claim 2 wherein the halogenated organic moiety is an active halogenated organic compound.

11. The improvement according to claim 10 wherein the active halogenated compound is chlorinated paraffin wax.

12. The improvement according to claim 11 wherein said halogenated organic moiety is chlorinated paraffin wax containing 50 to 80 weight percent chlorine.

13. The improvement according to claim 10 wherein the active halogenated organic compound is hexabromocyclohexane.

14. The improvement according to claim 10 wherein the active halogenated organic compound is pentabromochlorocyclohexane.

15. The improvement according to claim 1 wherein the halogenated moiety is a mixture of active halogenated organic compound and passive brominated organic compound.

16. The improvement according to claim 15 wherein the active halogenated organic compound is chlorinated paraffin wax.

17. The improvement according to claim 1 wherein the olefin polymer is an aliphatic hydrocaron α-monoolefin polymer.

18. The improvement according to claim 1 wherein the olefin polymer is an ethylene/vinyl acetate copolymer.

19. The improvement according to claim 17 wherein the α-monoolefin polymer is polyethylene.

20. The improvement according to claim 1 wherein the olefin polymer is ethylene/acrylic acid copolymer.

21. The improvement according to claim 1 wherein the olefin polymer is ethylene/ethyl acrylate copolymer, ethylene/acrylic acid copolymer, polyethylene, polypropylene, or ethylene/vinyl acetate copolymer.

22. The improvement according to claim 1 wherein the olefin polymer is a foamed polymer.

23. The improvement according to claim 2 comprising 100 weight parts of an olefin polymer containing from about 1 to about 20 weight parts of carbon black, from 2 to about 20 weight parts of elemental red phosphorus and from about 2 to about 20 weight parts of halogen as halogenated organic moiety such that the ratio of phosphorus to halogen is from about 4:1 to about 1:6.

24. The improvement according to claim 1 wherein the olefin polymer is a homopolymer of an aliphatic hydrocarbon α-monoolefin having from 2 to 12 carbon atoms.

25. The improvement according to claim 1 wherein the olefin polymer is a copolymer of an aliphatic hydrocarbon α-monoolefin having 2 to 12 carbon atoms and less than 50 mole percent of other copolymerizable monomer.

26. The improvement according to claim 2 wherein the olefin polymer is a copolymer of an aliphatic hydrocarbon α-monoolefin having 2 to 12 carbon atoms and less than 30 mole percent of other copolymerizable monomer selected from the group consisting of aliphatic hydrocarbon monoolefin and substituted α-monoolefin wherein the substituent is carboxylic acid, alkyl or haloalkyl ester of carboxylic and wherein alkyl or haloalkyl has from 1 to 12 carbon atoms.

27. The improvement according to claim 26 wherein the concentration of phosphorus is from about 1 to about 10 parts, the atomic ratio of phosphorus to halogen is from about 2:1 to about 1:3 and the sum of amount of phosphorus and amount of halogenated moiety is at least 5 parts based on 100 parts of polymer.

28. In an olefin polymer composition consisting essentially of an olefin polymer and a halogenated organic moiety wherein the olefin polymer is selected from the group consisting of ethylene/vinyl acetate copolymer, polyethylene, ethylene/acrylic acid copolymer, and ethylene/ethyl acrylate copolymer and the halogenated moiety is selected from the group consisting of hexabromobenzene 1-(2,4,5-tribromophenyl)-1-(2,4,6-tribromophenoxy)ethane, decabromodiphenyl ether, pentabromophenol, octabromobiphenyl, 1,2-bis(4-(2,3,3-tribromoalkyloxy) phenyl)-1,2-dibromoethane, tetrabromobisphenol-A, pentabromochlorocyclohexane, hexabromocyclohexane and chlorinated paraffin wax containing 50–80 weight percent chlorine; the improvement which consists essentially of the olefin polymer composition and elemental red phosphorus having a specific gravity greater than 2 in an amount of from about 1 to 10 weight parts per 100 weight parts of olefin polymer and provided that the atomic ratio of phosphorus to hydrogen is from about 2:1 to about 1:3 and the sum of the amount of phosphorus and the amount of the halogenated moiety is at least 5 weight parts based on 100 weight parts of polymer.

* * * * *

UNITED STATES PATENT AND TRADEMARK OFFICE
CERTIFICATE OF CORRECTION

PATENT NO. : 4,086,192

DATED : April 25, 1978

INVENTOR(S) : Charles F. Raley, Jr.

It is certified that error appears in the above-identified patent and that said Letters Patent are hereby corrected as shown below:

Column 1, line 32, delete "hydrocarbin" and insert --hydrocarbon--.

Column 1, line 61, delete "or" and insert --of--.

Column 2, line 27, delete "compositions" and insert --composition--.

Column 2, line 64, delete "substitutents" and insert --substituents--.

Column 3, line 46, delete "contaning" and insert --containing--.

Column 7, line 52, delete "up" and insert --upon--.

Column 7, line 57, delete "a" and insert --as--.

Column 8, line 48, delete "of" and insert --or--.

Column 14, line 35, delete "no" and insert --an--.

Column 14, line 55, delete "buring" and insert --burning--.

Column 17, line 56, delete "phosphorous" and insert --phosphorus--.

Column 19, line 25, after "from" and before "2", insert --about--.

UNITED STATES PATENT AND TRADEMARK OFFICE
CERTIFICATE OF CORRECTION

PATENT NO. : 4,086,192

DATED : April 25, 1978

INVENTOR(S) : Charles F. Raley, Jr.

It is certified that error appears in the above-identified patent and that said Letters Patent are hereby corrected as shown below:

Column 20, line 9, after "atoms" insert --, carboxylate having from 1 to 12 carbon atoms--.

Column 20, line 15, after "100" insert --weight--.

Column 20, line 35, delete "hydrogen" and insert --halogen--.

Signed and Sealed this

Twentieth Day of March 1979

[SEAL]

Attest:

RUTH C. MASON
Attesting Officer

DONALD W. BANNER
Commissioner of Patents and Trademarks